United States Patent Office 3,381,178
Patented Apr. 30, 1968

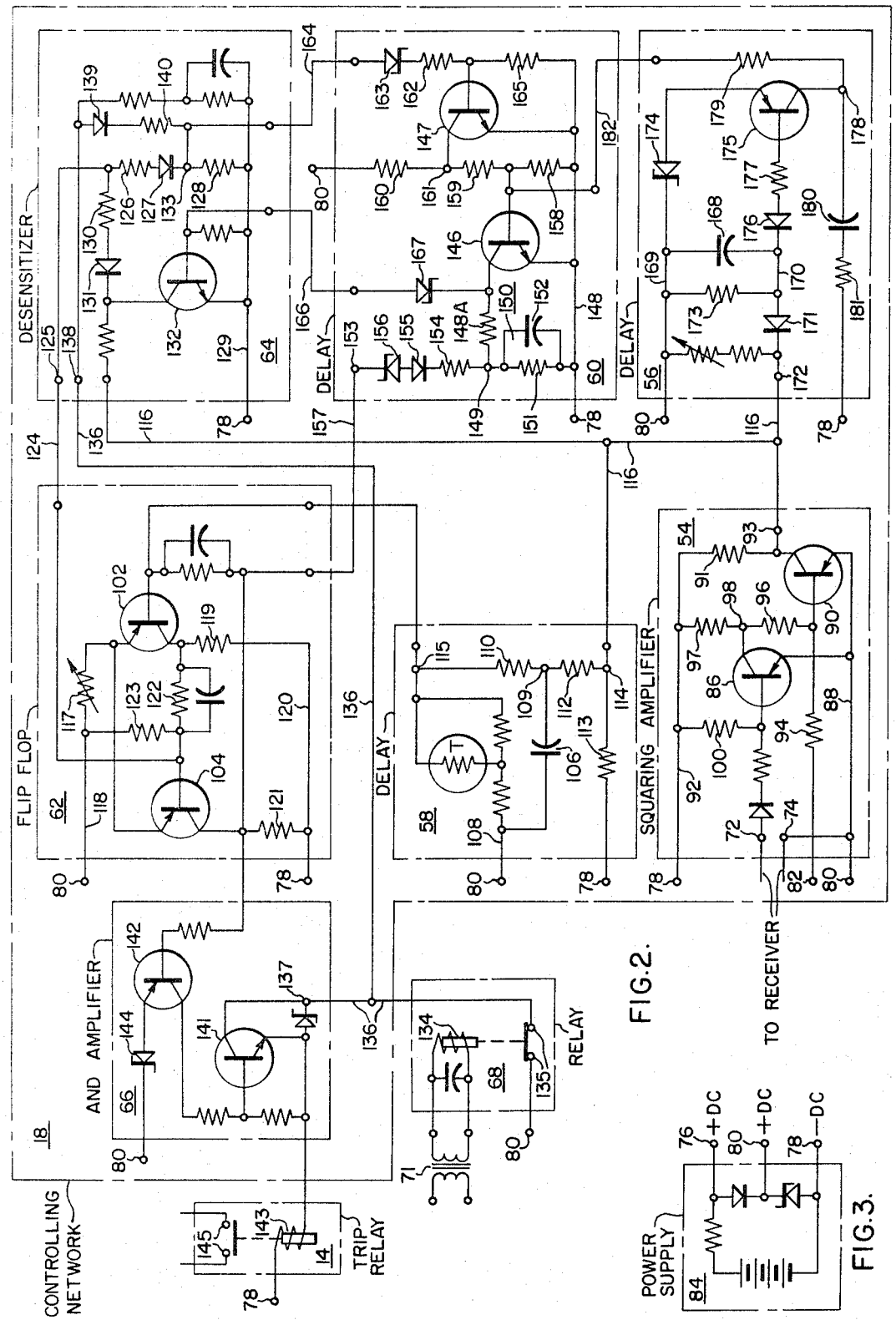

3,381,178
RELAYING SYSTEM FOR HIGH VOLTAGE
TRANSMISSION LINE UTILIZING A COU-
PLING CAPACITOR
George D. Rockefeller, Jr., Morris Plains, N.J., assignor
to Westinghouse Electric Corporation, Pittsburgh, Pa.,
a corporation of Pennsylvania
Filed June 17, 1965, Ser. No. 464,771
13 Claims. (Cl. 317—27)

ABSTRACT OF THE DISCLOSURE

A relaying system for a high voltage transmission line in which the current transformer and the transmitter actuated by the current transformer as well as the source of energy for the transmitter are all substantially at the potential of the transmission line while the trip controlling receiver and the trip actuating mechanism are all at a low potential with respect to ground. The control signals from all of the transmitters are transmitted to the trip controlling receiver through the coupling capacitor.

---

This invention relates generally to relaying systems and more particularly to a relaying system for very high voltage transmission lines such as 500 kilovolts and above.

Most relaying systems which have been used require at least a current responsive quantity to actuate the relaying apparatus. Such current quantities have normally been provided by current transformers. In systems requiring voltage quantities, these have been obtained either from voltage transformers or from various capacitor arrangements such as coupling capacitors or bushing potential devices. The coupling capacitor preferably comprises a plurality of series connected capacitor units in which only a portion of the voltage thereacross appears across any one capacitor unit. Such a coupling capacitor is often utilized to connect a carrier frequency transmitter to the power line and the voltage signal may be derived either from the coupling capacitor or from an additional capacitor connected in series with the lowermost one of the series connected capacitor units. The voltage quantity so provided is proportional to the voltage of the conductor to which the coupling capacitor is connected and eliminates the necessity of a potential transformer. Current transformers which may be associated with extra high voltage transmission networks operating at 500 kv. and above and which have their secondary windings connected to supply relaying systems which operate near ground potential are not readily available and are very expensive and add considerable cost to relaying systems.

In accordance with the teachings of this invention, the need for such a high voltage insulated current transformer is obviated by utilizing the current derived quantities at elevated voltages to supply a current signal which may be transmitted to grounded apparatus by means other than conducting material. More specifically, the current transformers are arranged to control one or more carrier frequency transmitters which are maintained at a potential with respect to ground which is not greatly different from that of the power network conductor from which the current quantity is obtained and thereby eliminating the need for a highly insulated current transformer. The output of the transmitter or transmitters is connected to the high potential end of the coupling capacitor and transmits its current signal therethrough to the low or ground potential where it is sensed by the carrier frequency receiver along with the current signal transmitted by the complemental relaying apparatus at the opposite end of the protected line section. An illustrative carrier current phase comparison relaying network is illustrated in Lensner Patent No. 2,406,615 and is a copending application of Conrad T. Altfather, Ser. No. 378,552, filed June 29, 1964, for Phase Comparison Relaying Device, now Patent No. 3,295,019 dated Dec. 27, 1966, and assigned to the same assignee as in this application. To further isolate the high potential apparatus, the energy for operating the transmitter is secured from a capacitor at the high potential end portion of the coupling capacitor. The transmitter so utilized not only supplies current intelligence to the relaying apparatus at the end portion of the protected line section but supplies the current information to the complemental low voltage receiver at the opposite end of the line section.

It is an object of this invention to eliminate the need for an expensive highly insulated current transformer in high voltage transmission networks for deriving the current control quantity for controlling the protecting relay apparatus.

Another object of this invention is to provide such a relaying apparatus in which the current signals are transmitted to ground potential by the same transmitter which transmits them to the remote relaying station.

A still further object is to provide a new and improved carrier current relaying system of the current comparison type.

Other objects of this invention will be apparent from the description, the appended claims, and the drawings in which:

FIG. 2 is a schematic diagram illustrating the low voltage portion of the mechanism shown in FIG. 1;

FIG. 3 is a schematic illustration of a power supply for furnishing power to the apparatus of FIG. 2.

Figure 1:
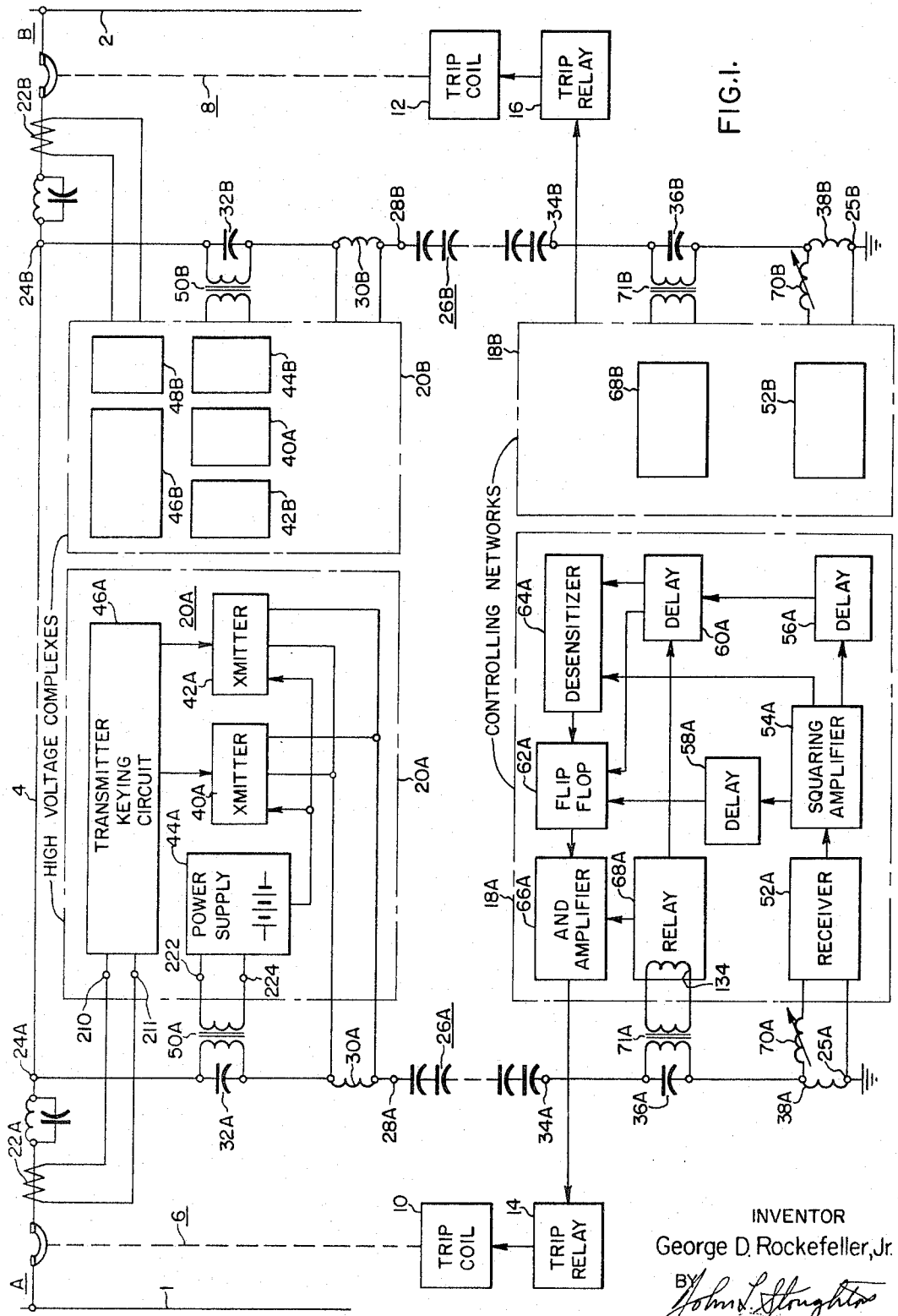
FIGURE 1 illustrates in block diagram a relaying system embodying the invention.

The invention is described and illustrated in connection with a single conductor which connects a first bus 1 at a first location A to a second bus 2 at a second location B remote from the location A. The invention is illustrated in this manner to simplify the showing and is of course applicable to a polyphase power transmission line which connects two widely spaced locations. Such a line would normally comprise three conductors connecting three power supply buses at location A to three power supply buses at location B in accordance with practices well known to and followed by those skilled in the art.

The numeral 1 represents a first power bus at location A, the numeral 2 a second power bus at location B connected together by a conductor 4 extending therebetween. One end portion of the conductor 4 is connected through the power contacts of a breaker 6 to the bus 1 and the other end is connected to the bus 2 through the power contacts of a second breaker 8. The breakers 6 and 8 may be actuated to open their contacts by suitable means such as the illustrated trip coils 10 and 12. Trip relays 14 and 16 may be provided if desired, to provide the necessary magnitude of power to actuate the breakers 6 and 8 respectively.

The trip relays 14 and 16 are actuated by low voltage complexes or breaker controlling networks 18A and 18B which are located at the locations A and B respectively. The controlling networks 18A and 18B are in turn controlled by the combined signals of the transmitters of the high voltage complexes 20A and 20B. The complexes 20A and 20B are of identical construction and only one thereof illustrated in detail. The networks 18A and 18B are also of identical construction and likewise only one thereof will be described in detail.

Current through the conductor 4 is sensed by current transformers 22A and 22B located at the locations A and B. The end portions of the conductor 4 inwardly of the transformers 22A and 22B are provided with terminals 24A and 24B. These terminals are connected to ground or earthed terminals 25A and 25B through coupling capacitors 26A and 26B respectively. The upper end terminal 28A of the coupling capacitor 26A is connected through a first inductance 30A and a capacitor 32A to the terminal 24A. The lower end terminal 34A of the coupling capacitor 26A is connected to the ground or earthed terminal 25A through a capacitor 36A and an inductance 38A. The earth serves as one conducting or transmitting medium connecting locations A and B.

The high voltage complex 20A includes first and second carrier frequency transmitters 40A and 42A, a power supply 44A, and a transmitter keying circuit 46A. The carrier frequency transmitters 40A and 42A may be of any suitable type which will provide a carrier frequency output signal which may be turned on and off by the keying circuit to provide discrete pulses of carrier frequency. The keying circuit 46A turns the transmitter on during predetermined half cycles of a first polarity and off during the predetermined half cycles of the opposite or second polarity of the alternating quantity derived from the conductor 4 by current transformer 22A.

The output circuits of the transmitters 40A and 42A are connected in parallel with each other and are connected in shunt with the inductance 30A. Two transmitters, each tuned to the same frequency, are utilized to reduce the need for servicing the high voltage equipment. The inductance 30A is proportioned so that it presents a low impedance to current flow at the frequency of the power being transmitted by the conductor 4 but presents a high impedance to current at the carrier frequency to effectively couple the parallelly connected output circuits of the transmitters in series between the coupling capacitor 26A and the conductor 4. Power for operating the transmitters 40A and 42A is derived from the power supply 44A which is connected across the terminals of the capacitor 32A through an isolating transformer 50A. The impedance presented by the capacitor 32A to current at this line frequency is sufficient to provide the desired voltage for energizing the power supply 44A without providing appreciable impedance at the carrier frequency.

The high voltage complex 20B is similarly connected to the end of the conductor 4 at the location B with the output of the transmitters connected across the impedance 30B and the transformer 50B connected across the capacitor 32B. The impedance 30B and capacitor 32B are connected in series between the terminal 28B of coupling capacitor 26B and the conductor terminal 24B. The transmitters 40B and 42B of the complex 20B are actuated to provide pulses of carrier signals under control of the current transformer 22B which actuates the keying circuits 46B.

The low voltage complex 18A comprises a receiver 52A, a squaring amplifier 54A, delay networks 56A, 58A and 60A, a flip-flop switching network 62A, a desensitizing network 64A, an AND amplifier 66A and a voltage sensing relay or control device 68A. The AND amplifier 66A is connected to actuate the trip relay 14 and thereby the trip coil 10 of the breaker 6 when concurrently energized by the relay 68A and the flip-flop 62A.

The signal input terminals of the receiver 52A are connected in shunt with the inductance 38A through tuning inductance 70A. The inductance 38A is similar to the inductance 30A whereby the receiver input circuit is effectively connected in series with the coupling capacitor 26A. The tuning inductance 70A is adjusted to balance out the capacitive effect of the capacitors 32A and 38A and of the coupling capacitor 26A at the carrier frequency supplied by the transmitters of the high voltage complexes 20A and 20B. All of the transmitters are tuned to transmit the same output carrier frequency. The receivers 52A, of the complex 18A, and 52B, of the complex 18B, are each tuned to the carrier frequency signal of the transmitters and are actuated by the sum of the signals provided thereby.

The transmitter keying circuits 46A and 46B of the complexes 20A and 20B are so polarized with respect to the output quantities of the current transformers 22A and 22B that when current is flowing into the conductor 4 at one end thereof and outwardly at the other end thereof the pulses of the transmitters 40A and 42A of the complex 20A will alternate with the pulses of the transmitters 40B and 42B of the complex 20B.

When a fault occurs in the conductor 4, current will flow inwardly into the conductor 4 from both of the locations A and B. This reverses the phase of one of the sets of transmitters 40A–42A or 40B–42B with respect to the other set whereby the transmitters 40A–42A and 40B–42B of both of the complexes 20A and 20B concurrently transmit and are held against transmitting to provide periods during which the receivers 52A and 52B are not energized. When the receivers are energized for only one-half of the fault current they are ineffective to prevent actuation of the associated AND amplifiers 66A and 66B and the consequent actuation of the trip relays 14 and 16 which thereupon energize the trip coils 10 and 12 to cause the breakers 6 and 8 to open and disconnect the faulted line 4 from the buses 1 and 2. This general type of relaying is known as phase comparison and is disclosed and claimed in the copending application of Conrad T. Altfather referred to above.

If the transmitters conduct at normal load current magnitudes, it is desirable to provide means to prevent any undesired tripping of the breakers 6 and 8 due to transients or other disturbances of the current flow in the conductor 4, which are not caused by a fault. These disturbances will normally occur with no substantial reduction in line voltage or at most a reduction for a short interval while a fault will normally be accompanied by a sustained voltage reduction. The AND amplifiers 66A and 66B are therefore each provided with a line voltage responsive signal input as determined by the voltage sensitive relays 68A and 68B. When the line voltage remains above a critical value, the relays hold the AND amplifier ineffective to actuate their respective trip relays 14 and 16. The relays 68A and 68B have their input circuits connected across the capacitors 36A and 36B respectively through isolating transformers 71A and 71B respectively. The voltage across the capacitors 36A and 36B is directly proportional to the voltage of the terminals 24A and 24B of conductor 4 and is at a potential, with respect to ground, which minimizes the dangers to operating personnel.

FIG. 2 illustrates schematically suitable circuitry for the voltage complexes 18A and 18B which is quite similar to that described in the copending Altfather application. To simplify the description of the complexes 18A and 18B, the A's and B's will be dropped (they being used to distinguish the components of the two complexes). The output signal of the receiver 52 is applied between the input terminals 72 and 74 of the wave shaper or squaring amplifier 54. This amplifier corresponds to the network 32 of the Altfather application. The squaring network 54 is energized from a suitable power supply 84 as indicated by the reference characters 78, 80 and 82 which correspond to the like numbered terminals of the power supply 84 illustrated in FIG. 3.

The squaring network 54 comprises a first normally conducting transistor 86 having its base connected through a current limiting resistor and diode to the input terminal 72 and its emitter connected through the positive bus 88 to the other input terminal 74. A second, normally nonconducting, transistor 90 is rendered conducting by the first transistor 86 when it is rendered non-conducting by the output signal of the receiver 52. The emitter of the transistor 90 is connected to the positive bus 88 and the collector is connected through a voltage dropping resistor 91 to the negative bus 92 whereby the potential of the output terminal 93 of the squarer 54 will be changed from substantially that of the negative bus 92 to that of the positive bus 81 when the transistor 90 is rendered conducting.

The transistor 90 has its base connected to the positive input terminal 82 through a voltage dropping resistor 94 and through two series connected resistors 96 and 97 to the negative bus 92. The common point or terminal 98 of the resistors 96 and 97 is connected through the collector-emitter circuit of the transistor 86 to the positive bus 88. With no signal applied between the input terminals 72 and 74, base current will flow from bus 88, emitter to base in the transistor 86, and through resistor 100 to the bus 92. The resulting current flow through the emitter-collector circuit causes the collector of transistor 86 to be held substantially at the potential of the bus 88 and the resistors 94 and 96 are effectively connected between the terminals 80 and 82 to maintain the potential of the base of the transistor 90 at a potential which is higher than that of the terminal 82 whereby transistor 90 is held non-conducting. When the receiver 52 places a positive to negative control potential between the input terminals 72 and 74, the transistor 86 becomes blocked. This permits the potential of the common terminal 98 to decrease to a potential below that of the bus 88, as determined by the voltage dividing resistors 94, 96 and 97, and base current flows in the transistor 90. The resulting conducting of the transistor 90 elevates the potential of the output terminal 93 and a signal is supplied by conductor 116 to the delay networks 56 and 58 and to the desensitizer network 64. This signal causes the desensitizer 64 to sensitize the flip-flop switch 62 whereby, at the end of a predetermined delay interval as determined by the delay network 58, any rendering of the transistor 102 conducting will block the normally conducting transistor 104, to actuate one of the input signals to the AND amplifier 66.

As is described more completely in the Altfather application, the delay interval of the delay 58 is the time required for the capacitor 106 to become critically charged to cause base drive current to flow in transistor 102. This charging occurs during the time intervals that none of the transmitters are transmitting. During intervals in which one or more transmitters conduct, the capacitor 106 discharges. When the transmitters at location A transmit alternately with those at location B (fault external to conductor 4), the duration of this non-transmission will be too short with respect to the transmission interval to permit the charging of capacitor 106 to its critical level required to cause transistor 102 to conduct. When the transmitters at locations A and B transmit concurrently the non-transmission interval will be approximate that required for one-half of a cycle of the alternating current in the conductor 4. The time delay introduced by the delay 58 is less than the time of the one-half cycle and preferably is in the order of one-quarter cycle (.004 second in the case of a sixty cycle frequency).

The delay network 58 includes a pair of power input terminals connected to the terminals 78 and 80 of the power supply 84 as indicated by the same numerals 78 and 80 on the power supply 84. The timing capacitor 106 is connected between a positive bus 108 (connected to power terminal 80) and a common terminal 109 of a pair of series connected resistors 110 and 112. A resistor 113 connects the free end terminal 114 of the resistor 112 to the terminal 78 maintained at the DC potential of the supply 84. The free end terminal of the resistor 110 is connected to the output terminal 115 of the delay 58.

The flip-flop switch 62 comprises the transistors 102 and 104 each of which has its emitter connected through a variable resistor 117 to a positive bus 118 connected to the terminal 80 of the power supply 84 as indicated by the like identified terminal of the switch 62. The collector of the transistor 102 is connected through a biasing resistor 119 to a negative bus 120 connected to the power supply terminal 78 as indicated by the like identified terminal of switch 62. The collector of the transistor 104 is connected through a biasing resistor 121 to the bus 120. The base of transistor 104 is connected through a resistor 122 to the collector of transistor 102 and through a resistor 123 to the positive bus 118. Preferably the resistor 122 is shunted by a capacitor. The values of the resistors 117, 119, 121, 122 and 123 are such that the transistor 104 is normally held conducting until the transistor 102 conducts.

To prevent the transistor 102 from causing an unwanted blocking of the transistor 104, additional current is caused to flow through the resistor 123 by the desensitizer network 64 so that the potential of the base of the transistor 104 is lowered sufficiently so that it will remain conducting irrespective of any increase in potential of the base of the transistor 104 due to conduction of the transistor 102. The circuit for this additional current flow through the resistor 123 extends from the bus 118 through the resistor 123 to the common connection of the base of transistor 104 and of the resistors 122 and 123, and therefrom through a conductor 124, the desensitizer input terminal 125 and the resistors 126 and 128 and diode 127 and a negative bus 129, of the desensitizer 64, to the negative terminal 78 of the power supply 84.

The desensitizer 64 additionally includes a shunt circuit extending from the input terminal 125 through a resistor 130, a diode 131 and a transistor 132 to the negative bus 129 in parallel with the circuit through the resistors 126 and 128 and diode 127. This shunt circuit is effective during intervals that the first-named circuit is ineffective because of an increase in the potential of a common terminal 133 of the diode 127 and the resistor 128 introduced by the relay 68.

The relay 68 is illustrated as being of the magnetic type having an energizing winding 134 and normally closed contacts 135 which are held open when the voltage supplied from the capacitor 36 through the transformer 71 is indicative of a normal voltage in the conductor 4. One of the contacts 135 is connected to the positive terminal 80 of the power supply 84 as indicated by the like identified relay terminal and the other terminal thereof is connected by a bus 136 to an input terminal 137 of the AND amplifier 66 and to an input terminal 138 of the desensitizer 64. The input terminal 138 is connected through a diode 139 and a resistor 140 to the terminal 133. With the bus 136 deenergized (contacts 135 open) no current flows from terminal 138 through the resistors 140 and 128 and the potential of terminal 133 is sufficiently low to cause current to flow from bus 118 through resistor 123 to maintain the base of the transistor 104 at a sufficiently low potential to insure continued conduction thereof irrespective of any conduction of transistor 102.

When the potential of the conductor 4 decreases in response to a fault, the contacts 135 of the relay 68 close current flows through the diode 139 and resistor 140 to the terminal 133 to raise the potential thereof and reduce the current flow through conductor 124. This reduction in current flow through the resistor 123 sufficiently increases the potential of the base of the transistor 104 so that it will block in response to conduction of the transistor 102. With the blocking of the transistor 104, current no longer flows through resistor 121 and the potential of the collector of transistor 104 decreases to substantially that of the negative bus 120 to provide one of the two required control signals for the AND amplifier 66.

The AND amplifier 66 includes a power transistor 141 and a relay transistor 142. The collector of transistor 141 is connected to the input terminal 137 and the emitter is connected through the energizing winding 143 of the trip relay 14 to the negative terminal 78 of the supply 84 as indicated by the like identified terminal of the relay 14. The terminal 137 is energized by the positive terminal 80 of the source 84 upon closure of the relay contacts 135. The emitter of the transistor 142 is connected through a Zener diode 144 to the terminal 80 of the source 84, as indicated by the like identified terminal of the amplifier 16, the collector is connected to the base of transistor 141 through the usual current limiting resistor and the base is connected through a usual current limiting resistor to the collector of the transistor 104 of the switch 62. With this arrangement, blocking of the transistor 104 causes the potential of its collector to decrease to substantially that of the bus 120 whereby base current flows in transistor 142 causing it to conduct, emitter to collector and supply base drive current to the transistor 141 and energize the trip relay 14. Energization of the relay 14 and the resultant closure of its contacts 145 energizes the trip coil 10 in a usual manner whereby the breaker 6 opens its contacts to disconnect the faulted conductor 4 from the bus 1. The breaker 8 will be similarly actuated to disconnect the conductor 4 from the bus 2.

If the fault is external to the conductor or line section 4, the receiver 62 will be energized substantially continuously by the transmitters 40A–42A and 40B–42B to cause the remote squaring amplifier 54 to maintain the potential of the input terminal 114 of the delay network 58 substantially the same as that of the positive bus 108 (except for any intermediate short intervals between the alternate signals) and the capacitor 106 cannot charge to the critical potential required to cause the transistor 102 to conduct and the transistor 102 remains in its non-conducting condition. Therefore, unlike the case of the internal fault in line section 4, the flip-flop 62 will not be actuated to provide this required signal to the AND amplifier 16 and the trip relay 14 cannot be actuated to cause the breaker 6 to open its contacts and disconnect the line section 4 from the bus 1 even through the contacts 135 of the relay 6 close in response to the existence of a fault.

If the flip-flop 62 remained sensitized during faults external to the line section 4, subsequent transients which might accompany the clearing of these external faults might falsely actuate switch 62 to cause the breaker 6 to unnecessarily and undesirably disconnect the line section 4 from bus 1. To avoid this, the flip-flop 62 is desensitized at the end of a desired time interval after the occurrence of the external fault, as determined by the delay network 60.

The delay network 60 comprises a normally conducting transistor 146 and a normally blocked or nonconducting transistor 147. Each of these transistors has its emitter connected to a negative bus 148 which is connected to the negative terminal 78 of the supply 84 as indicated by the like identified terminal of the delay 60. The collector of the transistor 146 is connected through a current limiting resistor 148A to a terminal 149. This terminal 149 is connected through a resistor-capacitor network 150, comprising a timing capacitor 151 and a bleeder resistor 152 connected in parallel, to the bus 148. The terminal 149 is also connected to a control terminal 152 through serially connected resistor 154, diode 155 and Zener diode 156. The terminal 153 is connected by a conductor 157 to the collector of the normally conducting transistor 104 of the switch 62.

The base of the transistor 146 is connected to the common connection between a pair of resistors 158 and 159 of a plurality of resistors 158, 159 and 160 serially connected between the negative bus 148 and the terminal 80 of the source 74 as indicated by the like identified terminal of the delay 60. The collector of transistor 147 is connected to the common connection 161 of the resistors 159 and 160 and the emitter thereof is connected to the bus 148. When the transistor 147 is in its normally non-conducting state, the resistors 158, 159 and 160 maintain the potential of the base of the transistor 146 sufficiently elevated to keep it in its normally conducting state. When, however, the transistor 147 conducts, the potential of the common connection 161 is brought substantially to that of the negative bus 148 and the transistor 146 ceases to conduct.

The base of the transistor 147 is connected through a resistor 162, a Zener diode 163, and a conductor 164 to the terminal 133 whereby its conduction is controlled directly by the potential of the terminal 133 of the desensitizer 64 and indirectly by the closure of the contacts 135 of the voltage sensing relay 68. With the terminal 133 energized solely through the conductor 124, the drop across the resistor 128 is less than the breakover voltage of the Zener diode 163 and no base drive current flows to the transistor 147 and it remains non-conducting. When the contacts 135 close and current flows from the conductor 136 through the resistors 128 and 140, potential of the terminal 133 increases sufficiently to cause the diode 163 to breakover and base current then flows to render transistor 147 conducting. A resistor 165 is connected between the base and the emitter of transistor 147 to bleed the leakage current of the diode 163.

The terminal 149 of the delay 60 is connected through the resistor 148A and a Zener diode 167 and conductor 166 to the base of the desensitizer transistor 132. Since the transistor 146 normally conducts, no base drive current is supplied to the transistor 132 and it remains blocked. When the relay 68 closed its contacts 135 in response to the existence of a fault, the potential of the terminal 133 increases. This increase in potential sensitizes the flip-flop 62 and causes the transistor 147 to conduct and thereby block the normally conducting transistor 146. Blocking of the transistor 146 causes the capacitor 151 to charge at a controlled rate. When the charge on the capacitor 151 reaches the breakover voltage of the diode 167, base current will flow to the transistor 132 which conducts to establish a current path in shunt with the resistors 126 and 128 through the resistor 130 and diode 131. This current flow like that through the resistor 126 will increase the voltage drop across the resistor 123 and reduce the potential of the base of the transistor 104 sufficiently to cause the transistor 104 to remain conducting irrespective of the conductive condition of the transistor 102 (desensitize the switch 62 so that it will not be actuated by a transient to falsely open the breaker).

If a fault, as distinguished from a transient, should occur in the line section 4 subsequent to the timing out of the delay 60 and the consequent desensitizing of the switch 62, it is desirable to actuate the breaker 6 to disconnect the faulted line section 4. The delay 56 acts to sense the difference between a transient for which the breaker should not open and a fault for which the breaker should open. This distinguishing is done on a time basis founded upon the fact that the time duration of a transient is less than the duration of a fault. The delay 56 prevents the resensitizing of the switch 62 until the apparent fault condition exists for a predetermined time greater than the time interval of any expected transient. This interval may be two cycles of the power line frequency.

The delay network 56 which times this predetermined interval comprises a timing capacitor 168 which is connected between a positive bus 169 (connected to the positive terminal 80 of the source 84 as indicated by the like identified terminal of the delay 56) and a bus 170 connected through a diode 171 to a terminal 172 to which the bus 116 is connected. During the intervals in which the transistor 90 conducts, the buses 169 and 170 will all be substantially at the potential of the terminal 80 of the power supply 84, and the timing capacitor 168 will remain discharged. Any increments of charging current which flow to the capacitor 168 during the brief intervals between the conducting periods of the transistor 90 will be substantially completely drained away by the discharge resistor 173 connected in shunt with the capacitor 168. This is the operating condition of the capacitor 168 except when the line section 4 is faulted since the transmitters 40A-42A and 40B-42B cause the receivers 52A and 52B to emit an output signal substantially at all times that current flows into one end of and outwardly of the other end of the line sections 4.

In the event the line section 4 should fault, the transistor 90 would conduct for only one-half of the time. During the non-conducting period of the transistor 90, charging current flows from bus 169 through capacitor 168, bus 170, diode 171, terminal 172, bus 116, and resistor 91 to the negative bus 92. At the end of the predetermined delay time of the delay 56, which as set forth is preferably two off periods of the transistor 90, the capacitor 168 will receive its critical charge which causes the Zener diode 174 to breakover and supply base drive current to a transistor 175. For this purpose, the positively charged terminal of the capacitor 168 is connected to the emitter of the transistor 175 and the negative terminal thereof is connected through a diode 176 and resistor 177 to the base of the transistor 175. The emitter-collector circuit of the transistor 175 extends from the positive bus 169, through the Zener diode 174 to a common terminal 178 of a resistor 179 and a capacitor 180. The other terminal of the capacitor 180 is connected through a resistor 181 to the negative terminal 78 of the power supply 84 as indicated by the like identified terminal of the delay 56. The other terminal of the resistor 179 is connected by a conductor 182 to the base of the transistor 146 of the delay 60.

When the transistor 175 is not conducting, the opposite terminals of the capacitor 180 are connected through the resistors 181 and 158 to the same power source terminal 78 and the capacitor 180 cannot act to cause the transistor 146 to conduct in response to conduction of the transistor 147. When, however, the delay 56 times out and the transistor 175 conducts the potential of the terminal 178 is raised sufficiently to supply base current to the transistor 146 which thereupon conducts even though the transistor 147 remains in its conducting state. Conduction of the transistor 146 discharges the timing capacitor 152 and brings the potential of the common connection of the Zener diode 167, the collector of the transistor 146 and of the resistor 148A to the potential of the negative bus 148. This terminates further base drive current to the transistor 132 which ceases to conduct. This results in a decreased current flow through the voltage dropping resistor 123 so that the switch 62 is resensitized to cause blocking of the transistor 104 in response to the conduction of the transistor 102. From the foregoing, it will be apparent that this results in an operation of the breaker 6 since both signals are now being supplied to the AND amplifier 66.

Figure 4:
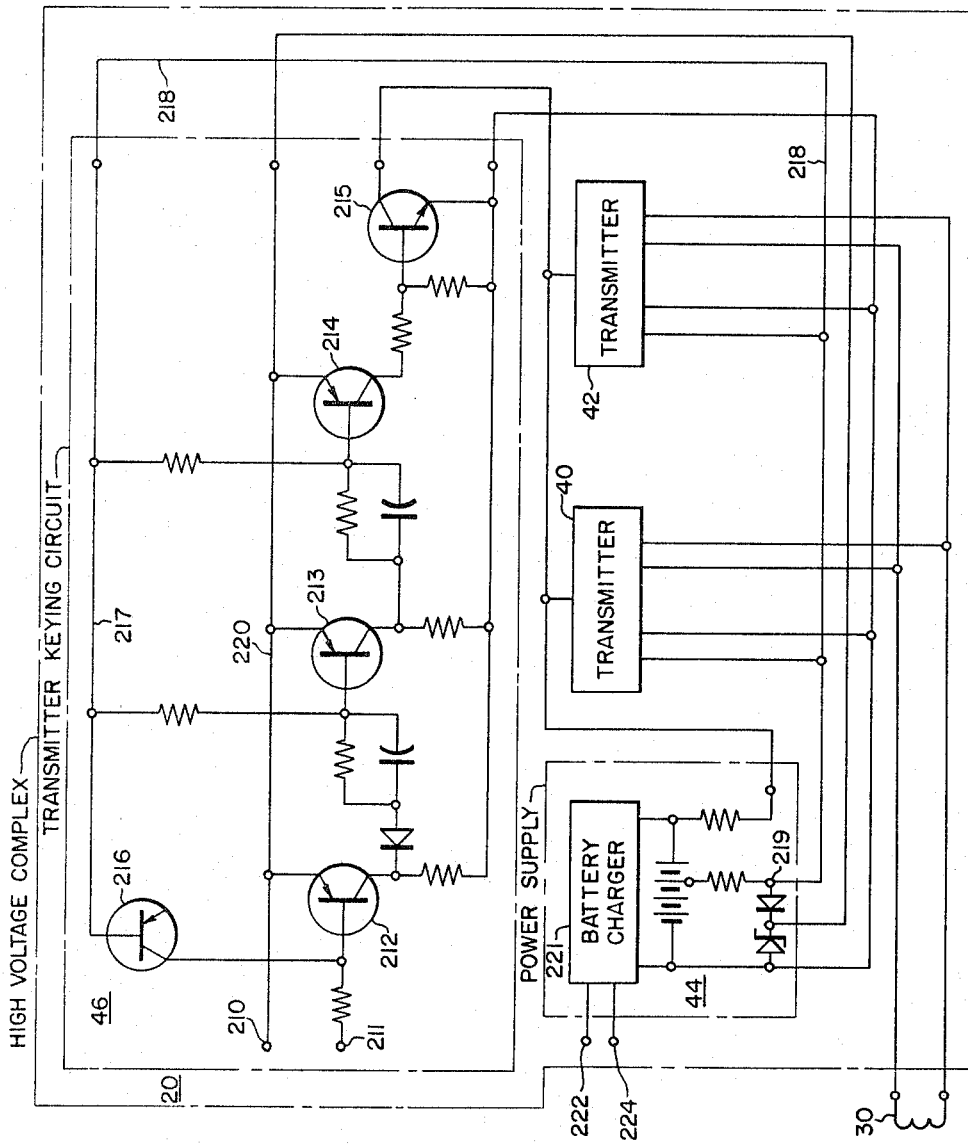
FIG. 4 is a partially schematic, partially block diagram of the high voltage portion of the apparatus of FIG. 1.

The high voltage complex 20 is more fully illustrated in FIG. 4. The output of the current transformer 22 is connected across the input terminals 210 and 211 of the transmitter keying circuit 46.

The transmitter keying circuit 46 comprises a plurality of transistors 212, 213, 214, 215 and 216. The transistor 216 is utilized for temperature compensating the circuit 46 and has its base connected to a positive bus 217 which is connected by a conductor 218 to a terminal 219 of the power supply 44. The collector of the transistor 216 is connected to the base of the transistor 212 which base is also connected through a current limiting resistor to the input terminal 211. The emitter of this transistor 212 is connected through a bus 220 to the other input terminal 210 whereby the transistor 212 conducts and blocks under control of the alternating frequency output of the current transformer 22 as phased by the network 48. The transistors 213 and 214 amplify the output signals of the transistor 212. The transistor 215 is arranged in the control circuits of the transmitters 40 and 42 to control the intervals that they transmit output signals from their output terminals to the carrier circuit. A more detailed description of the keying circuit 46 and transmitters 40 and 42 may be found in the copending Altfather application above-identified.

The power supply 44 may take any conventional form. As shown, it comprises a battery charging device 221 which has its input terminals 222 and 224 connected to the secondary winding of the transformer 50, which as indicated above is energized by the voltage appearing across the capacitor 32.

Although the invention has been described with reference to a single embodiment thereof, numerous modifications are possible and it is desired to cover all modifications falling within the spirit and scope of the invention.

What is claimed and is desired to be secured by United States Letters Patent is as follows:

1. In a relaying system for a high voltage transmission line, a pair of terminals, one of said terminals being adapted to be connected to one conductor of the transmission line to be protected, the other of said terminals being adapted to be connected to ground, a coupling capacitor having terminals, first and second potential capacitors, first and second and third inductances, a power supply, a signal generator, a signal receiver, a switch controlling network having first and second input circuits and an output circuit, circuit means connecting a first of said coupling capacitor terminals to said one terminal and including said first potential capacitor and said first inductance, said circuit means further connecting a second of said coupling capacitor terminals to said other terminal and including said second potential capacitor and said second inductance, means connecting said power supply to said first potential capacitor whereby said power supply receives energy from said circuit means, means connecting said generator to said power supply for energization therefrom and to said first inductance for applying a generated signal to said circuit means, a current actuated device adapted to be associated with said line to be protected for actuation thereby, means connecting said current device to said signal generator for actuation by said current device, means connecting said signal receiver to said second inductance whereby said receiver is actuated by signals appearing in said circuit means, means connecting said first input circuit of said switch network to said receiver for actuation thereby, and means connecting said second input circuit of said switch network to said second capacitor, said last-named means being effective to restrain operation of said switch network as long as the magnitude of the potential across said second capacitor is above a predetermined magnitude.

2. A station relaying apparatus for attachment to a transmission line at a first relaying station, a coupling impedance device having first and second end terminals, a signal transmitter having control terminals and output terminals, a fault signal sensor for association with said line to signal a faulty operation thereof, a first connector adapted to be connected to said line, first circuit means connecting said first end terminal to said connector and including said output terminals, a second connector adapted to be connected to a signal transmitting medium, a signal receiver having input terminals and output terminasl, second circuit means connecting said second end terminal to said second connector and including said input terminals, and a control network connected to said output terminals of said receiver for actuation by said receiver.

3. The combination of claim 2 in which a second said relaying apparatus is provided for attachment to said line at a second relaying station spaced along said line from said first relaying station, said receiver at said first station being tuned to receive said output signal of said transmitter at said second station, said receiver at said second station being tuned to receive said output signal of said transmitter at said first station.

4. The combination of claim 3 in which there is provided first and second control devices, each said control device having input means and output means, means connecting said input means of said first control device to said second circuit means and said output means of said first control device to said control network of said relaying apparatus at said first relaying station, means connecting said input means of said second control device to said second circuit means and said output means of said second control device to said control network of said relaying apparatus at said second relaying station, each said control device being operable to provide a control signal in response to an output signal of predetermined minimum magnitude by the respective said output signal of the said receiver of the said apparatus to which it is connected, said control signals being operable to render the respective said control networks effective to respond to their respective said receivers.

5. In combination an alternating current transmission line connecting a first and a second station and including at least one conductor extending between said stations, first and second breakers located at said first and second stations respectively and operable to connect and disconnect said conductor to electrical energy supplying components, each said breaker having a trip coil, first and second coupling capacitors each said coupling having a high potential end and a low potential end, first and second carrier frequency transmitters, each said transmitter having an input and an output, each said transmitter being operable under control of its said input to establish an output signal at its said output having an output carrier frequency greater than the frequency of the alternating current of said line, first and second and third and fourth impedance devices, each said impedance device having a low impedance to said low frequency to permit substantial unimpeded current flow at said line frequency and a substantially greater impedance to said output frequencies of said transmitters to substantially block the flow of said output signals of said transmitters, first and second carrier frequency receivers, each said receiver having input connections and output connections and effective to provide an output quantity at its said output connection in response to the existence of a carrier signal of a critical frequency at its said input connection, first means individually connecting said high potential end of said first and second coupling capacitors through said first and second impedance devices to said conductor at said first and second stations respectively, second means individually connecting said low potential ends of said first coupling capacitors through said third impedance device and of said second coupling capacitors through said fourth impedance device respectively to spaced portions of a conducting medium connecting said stations, first and second voltage sensing detectors individually connected in said second circuit means between said low potential ends of said first and second coupling capacitors respectively and said conducting medium, first and second current detecting devices associated with said conductor at said first and second stations respectively, said first detecting device being connected to said input of said first transmitter for controlling its said output signal, said second detecting device being connected to said second transmitter for controlling its said output signal, said outputs of said first and second transmitters being connected individually in shunt with said first and second impedance devices respectively, said input connections of said first and second receivers being connected individually in shunt with said third and fourth impedance devices respectively, first and second control networks connected respectively between said output connections of said first receiver and said first breaker and between said output connections of said second receiver and said second breaker, each of said control networks being effective as a consequence of a predetermined signal from the said receiver with which it is associated to actuate said breaker, and first and second control means connected between said first voltage detector and said first control network and between said second voltage detector and said second control network, each said control means being effective when its associated said voltage detector responds to a voltage of said conductor above a predetermined minimum value to render the said network with which said control means is associated, ineffective to actuate the associated said breaker.

6. The combination of claim 5 in which said voltage sensing detectors are capacitors series connected with said coupling capacitors, in which each of said first connecting means includes an individual capacitor connected in series between its respective said coupling capacitor and said one conductor, in which there is provided first and second energy storing units connected to energize said first and said second transmitters respectively, and in which said first and second energy units are connected individually to the one of said individual capacitors which is associated with the same stations as is said storage unit.

7. An apparatus for protecting a transmission line having at least one conductor which is disconnectable from a power supply bus as a result of the energization of a breaker trip coil, a wave trap, a current transformer comprising means connecting one end of said conductor to said first bus and including said contacts of said breaker and said wave trap and said transformer, a coupling capacitor, first and second capacitors, first and second inductances, a first circuit means connecting a first portion of said coupling capacitor to said one end portion of said conductor and including said first capacitor and said first inductance, a second circuit means connected to a second portion of said coupling capacitor and including said second capacitor and said second inductance, said second capacitor and said second inductance being connected in series, a carrier frequency transmitter having a power input circuit and a control circuit and an output circuit, said transmitter being effective to provide a carrier frequency output signal at its said output circuit solely upon the application of a start signal to its said control circuit, a keying network having an input circuit and an output circuit and effective to provide said start signal solely during one polarity of a control signal applied to its said input circuit, means connecting said input circuit of said keying network to said transformer and its said output circuit to said control circuit of said transmitter whereby said transmitter is effective to supply its said output signal solely during a selected half cycle of the output potential of said transformer, means connecting said output circuit of said transformer across said first inductance, an energy storage device, means connecting said storage device across said first capacitor whereby said storage device is energized by the potential appearing across said capacitor, means connecting said storage device to said power input terminals of said transmitter for energization thereof by power from said storage device, a receiver having an input circuit and an output circuit energized with a controlling signal when a carrier frequency signal is applied to its said input circuit, means connecting said input circuit of said receiver across said second inductance, a breaker control network connecting said output circuit of said receiver to said trip coil and having a normal operating condition, said control network being actuated from its said normal operating condition by said receiver solely during the existence of said controlling signal, said control network being operable in its said normal condition to energize said trip coil to cause opening of said breaker contacts, and a potential sensitive control apparatus having its input circuit connected to said second circuit means to respond to the potential across said second capacitor, said potential sensitive apparatus having an output circuit connected to said breaker control network and effective at potentials across said second capacitor above a predetermined minimum value to render said breaker control network ineffective to actuate said trip coil.

8. The combination of claim 7 in which said transmission line is disconnectable from a second energized bus as a result of the energization of a second breaker trip coil, a second apparatus similar to an apparatus as described in claim 7, said second apparatus being located more closely adjacent said second bus than said first bus, said transformer of said second apparatus being phased with respect to said transformer of said first apparatus such that current flowing into said one conductor through said transformers will produce said start signals during corresponding half cycles of said flowing current, and phase shift.

9. The combination of claim 8 in which at least one of said apparatuses is provided with a phase shifting device to adjust the relative phasing of the output quantities of said transformers to compensate for the phase change imparted to said carrier frequency by the inherent characteristics of said one conductor.

10. The combination of claim 9 in which each said apparatus includes a phase shifting device, said phase shifting devices being connected individually between the said transformer and the said keying network of the said apparatus of which it forms a part, each said apparatus includes a third inductance, said third inductances being connected individually in said power input circuit of the said transmitter of the said apparatus of which it forms a part, and means connected in circuit with said carrier output to compensate at least in part for the capacity effect of at least one of said coupling capacitors.

11. A relaying apparatus comprising a first terminal adapted to be connected to a transmission line conductor which is energized to a high potential with respect to ground, a second terminal adapted to be connected to a conductor which is at a relatively low potential with respect to ground, a coupling capacitor having a high voltage terminal and a low voltage terminal, first means connected between said high voltage terminal and said first terminal whereby said first means is maintained at a potential which is substantially that of said first terminal, second means connected between said low voltage terminal and said second terminal and adapted to be maintained at a potential which is substantially that of said second terminal, a signal transmitter having its output connected to said first means to supply a control signal thereto, a signal receiver connected to said second means for actuation by said control signal.

12. The combination of claim 11 in which there is provided an energy supplying device having an input connection connected between said first terminal and said high voltage terminal for deriving energy from said first and high voltage terminals and having an output connection, said output connection of said energy supplying device being connected to said transmitter to supply operating energy thereto.

13. The combination of claim 11 in which there is provided a breaker actuating device including an AND means, said AND means having a first input energized from said receiver and a second input, a voltage sensing means having its input connected to said second means and its output connected to said second input of said AND means, said breaker actuating device being effective solely when it is actuated by signals from said sensing means and said receiver.

References Cited
UNITED STATES PATENTS 2,692,352   10/1954   Ward  ------------ 317—29 X
3,311,785   3/1967   Lensner  ---------- 317—27 X MILTON O. HIRSHFIELD, *Primary Examiner.*

R. V. LUPO, *Assistant Examiner.*